(12) United States Patent
Chen

(10) Patent No.: US 10,761,807 B2
(45) Date of Patent: Sep. 1, 2020

(54) FLOATING-POINT NUMBER OPERATION CIRCUIT AND METHOD

(71) Applicant: REALTEK SEMICONDUCTOR CORPORATION, Hsinchu (TW)

(72) Inventor: Chia-I Chen, Hsinchu County (TW)

(73) Assignee: REALTEK SEMICONDUCTOR CORPORATION, Hsinchu (TW)

(*) Notice: Subject to any disclaimer, the term of this patent is extended or adjusted under 35 U.S.C. 154(b) by 87 days.

(21) Appl. No.: 16/167,603

(22) Filed: Oct. 23, 2018

(65) Prior Publication Data

US 2019/0138274 A1 May 9, 2019

(30) Foreign Application Priority Data

Nov. 7, 2017 (TW) .............................. 106138354 A

(51) Int. Cl.
*G06F 7/544* (2006.01)
*G06F 7/487* (2006.01)
*G06F 7/485* (2006.01)
*G06F 7/483* (2006.01)
*G06F 7/499* (2006.01)

(52) U.S. Cl.
CPC ............ *G06F 7/5443* (2013.01); *G06F 7/483* (2013.01); *G06F 7/485* (2013.01); *G06F 7/487* (2013.01); *G06F 7/49947* (2013.01); *G06F 2207/3884* (2013.01)

(58) Field of Classification Search
CPC ........ G06F 7/483; G06F 7/485; G06F 7/4876; G06F 7/499–49994; G06F 7/5443; G06F 7/57; G06F 7/575; G06F 2207/3884

USPC .......................................... 708/501, 503, 508
See application file for complete search history.

(56) References Cited

U.S. PATENT DOCUMENTS

| | | | |
|---|---|---|---|
| 4,841,467 A | 6/1989 | Ho et al. | |
| 5,517,438 A | 5/1996 | Dao-Trong et al. | |
| 8,924,454 B2* | 12/2014 | Lau | G06F 7/483 708/501 |
| 8,990,283 B2* | 3/2015 | Inaganti | G06F 7/483 708/501 |
| 9,348,795 B1* | 5/2016 | Langhammer | G06F 7/483 |
| 9,507,565 B1* | 11/2016 | Streicher | G06F 7/49947 |
| 2003/0055859 A1 | 3/2003 | Seidel et al. | |
| 2011/0072066 A1* | 3/2011 | Lutz | G06F 7/483 708/497 |
| 2017/0090868 A1 | 3/2017 | Lutz | |
| 2019/0026077 A1* | 1/2019 | Manzo | G06F 7/483 |

* cited by examiner

*Primary Examiner* — Andrew Caldwell
*Assistant Examiner* — Emily E Larocque
(74) *Attorney, Agent, or Firm* — WPAT, PC

(57) ABSTRACT

This invention discloses a floating-point number operation circuit and a method thereof. The floating-point number operation circuit is configured to perform a fused multiplication and accumulation (fused mac) operation or a multiplication and accumulation (mac) operation on a first operand, a second operand, and a third operand, or perform a multiplication operation on the first operand and the second operand. The floating-point number operation circuit includes two rounding circuits, a multiplication circuit, a selection circuit, a control circuit, and an addition circuit. The control circuit controls the scheduling of various operations and the use of resources on each calculation path.

12 Claims, 6 Drawing Sheets

FLOATING-POINT NUMBER OPERATION CIRCUIT AND METHOD

BACKGROUND OF THE INVENTION

1. Field of the Invention

The present invention generally relates to floating-point number operations, and, more particularly, to the multiplication operation, conventional multiplication and accumulation (mac) operations, and fused multiplication and accumulation (fused mac) operations of floating-point numbers.

2. Description of Related Art

The floating-point arithmetic operations of a processor often involve operations of addition, subtraction, multiplication, division, multiplication and accumulation (mac), and fused multiplication and accumulation (fused mac). Although the mac operation and the fused mac operation both calculate A*B+C (A, B, and C are floating-point numbers), the fused mac operation gives a relatively accurate result compared to the mac operation since two rounding operations are conducted in each mac operation (one for the multiplication operation and the other for the addition operation) whereas only one rounding operation is conducted in each fused mac operation (for the addition operation). For conventional processors, operations are often optimized separately, which can only slightly improve the overall performance of the processor. Therefore, there is a need for an optimized circuit that takes into consideration multiple operations simultaneously to simplify the circuit and improve the processor performance.

SUMMARY OF THE INVENTION

In view of the issues of the prior art, an object of the present invention is to provide a floating-point number operation circuit and its associated method, so as to simplify the circuit and improve the performance of the processor.

Note that "multiply", "add", and "accumulate" are respectively equivalent to "multiplication", "addition", and "accumulation". In this disclosure, the latter group is used.

A floating-point number operation circuit is provided. The floating-point number operation circuit is configured to perform a fused multiplication and accumulation (fused mac) operation or a multiplication and accumulation (mac) operation on a first operand, a second operand, and a third operand, or perform a multiplication operation on the first operand and the second operand. The floating-point number operation circuit includes a multiplication circuit, a selection circuit, a control circuit, and an addition circuit. The multiplication circuit is configured to receive the first operand and the second operand and perform the multiplication operation on the first operand and the second operand to generate an unrounded product and a rounded product. The selection circuit is coupled to the multiplication circuit and configured to receive the unrounded product and the rounded product and output either the unrounded product or the rounded product. The control circuit is coupled to the selection circuit and configured to control the selection circuit to output the rounded product when the floating-point number operation circuit performs the mac operation, and control the selection circuit to output the unrounded product when the floating-point number operation circuit performs the fused mac operation. The addition circuit is coupled to the selection circuit and configured to receive the third operand and either the unrounded product or the rounded product, and add the third operand and either the unrounded product or the rounded product to obtain an operation result of the fused mac operation or the mac operation. A total number of input bits of the addition circuit is greater than twice the number of bits of the first, second or third operand.

A floating-point number operation method is also provided. The floating-point number operation method performs a fused mac operation or a mac operation on a first operand, a second operand, and a third operand, or performs a multiplication operation on the first operand and the second operand. The method includes steps of: using a multiplication circuit to receive the first operand and the second operand, and using the multiplication circuit to perform the multiplication operation on the first operand and the second operand to generate an unrounded product and a rounded product; using a selection circuit to receive the unrounded product and the rounded product, and outputting either the unrounded product or the rounded product; controlling the selection circuit to output the rounded product when the mac operation is performed, and controlling the selection circuit to output the unrounded product when the fused mac operation is performed; and using an addition circuit to receive the third operand and either the unrounded product or the rounded product, and using the addition circuit to perform an addition operation on the third operand and either the unrounded product or the rounded product to obtain an operation result of the fused mac operation or the mac operation. A total number of input bits of the addition circuit is greater than twice the number of bits of the first, second or third operand.

The floating-point number operation circuit and its associated method of the present invention integrate the multiplication operation, the multiplication and accumulation (mac) operation, and the fused multiplication and accumulation (fused mac) operation for floating-point numbers. These three operations are optimized at the same time for the floating-point number operation circuit and the method thereof disclosed in the present invention. Therefore, this invention has better processor performance and a simpler circuit in comparison with the conventional technology.

These and other objectives of the present invention no doubt become obvious to those of ordinary skill in the art after reading the following detailed description of the preferred embodiments with reference to the various figures and drawings.

DETAILED DESCRIPTION OF THE EMBODIMENTS

The following description is written by referring to terms of this technical field. If any term is defined in this specification, such term should be explained accordingly. In addition, the connection between objects or events in the below-described embodiments can be direct or indirect provided that these embodiments are practicable under such connection. Said "indirect" means that an intermediate object or a physical space exists between the objects, or an intermediate event or a time interval exists between the events.

The disclosure herein includes a floating-point number operation circuit and its associated method. On account of that some or all elements of the floating-point number operation circuit could be known, the detail of such elements is omitted provided that such detail has little to do with the features of this disclosure and this omission nowhere dissatisfies the specification and enablement requirements. In addition, some or all of the processes of the floating-point number operation method can be performed by the floating-point number operation circuit or its equivalent. A person having ordinary skill in the art can choose components or steps equivalent to those described in this specification to carry out the present invention, which means that the scope of this invention is not limited to the embodiments in the specification.

Figure 1:
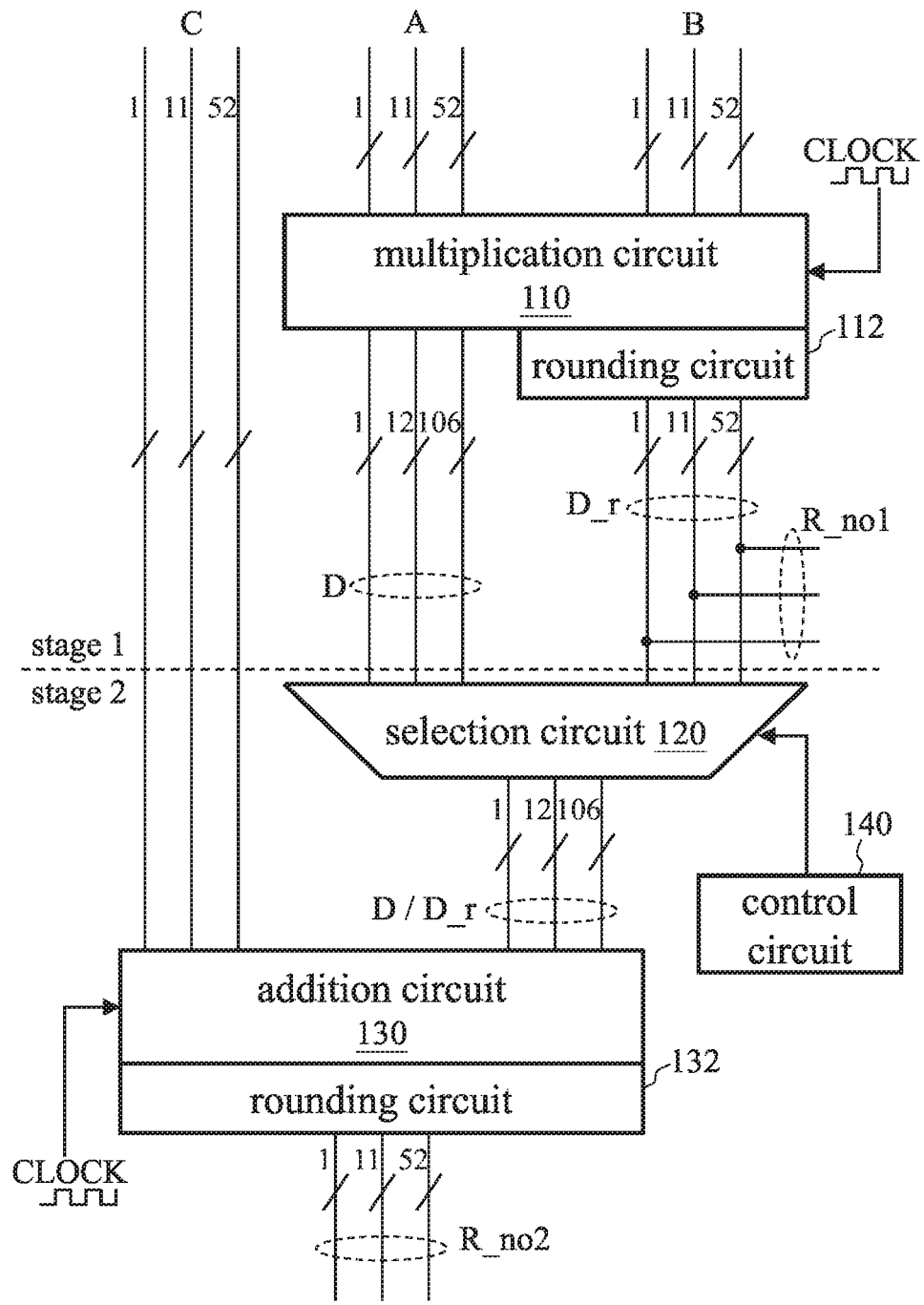
FIG. 1 illustrates a circuit diagram of a computing section of a floating-point number operation circuit according to the present invention.

FIG. 1 is a circuit diagram of a computing section of a floating-point number operation circuit according to the present invention. In the figure, double precision (with one bit representing the sign, 11 bits representing the biased exponent, and 52 bits representing the trailing significand) is used as an example, but the present invention may also be applied to other precisions defined by IEEE 754-2008. The computing architecture 100 of the floating-point number operation circuit is configured to perform general computations of floating-point numbers (including multiplication operations, multiplication and accumulation (mac) operations, and fused multiplication and accumulation (fused mac) operations) and includes a multiplication circuit 110, a rounding circuit 112, a selection circuit 120, an addition circuit 130, a rounding circuit 132, and a control circuit 140. The computing architecture 100 of the floating-point number operation circuit optimizes these three operations simultaneously by repeating the use of or sharing the multiplication circuit 110 and the addition circuit 130 to improve circuit performance and reduce circuit area.

Figure 2:
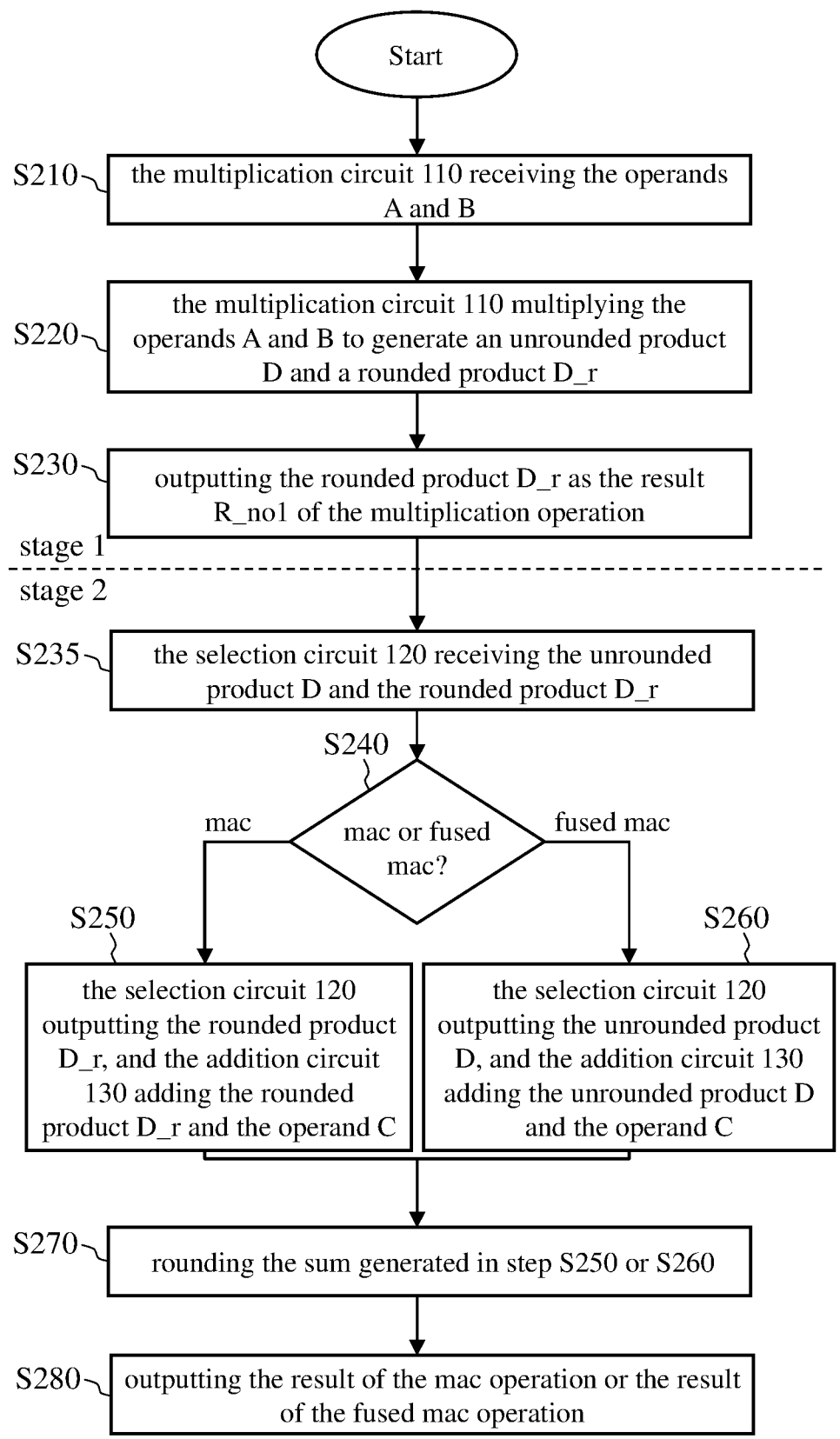
FIG. 2 illustrates a flowchart of a computing section of a floating-point number operation method according to the present invention.

FIG. 2 is a flowchart of a computing section of a floating-point number operation method according to the present invention. This flowchart corresponds to the circuit diagram of FIG. 1 First, the multiplication circuit 110 receives the operands A and B in stage 1 (step S210) and then multiplies the operands A and B to thereby generate a product D and a product D_r (step S220). The product D is the result which is not trimmed (normalized, or rounded/truncated), while the product D_r is the trimmed (normalized, or rounded/truncated) counterpart of the product D by the rounding circuit 112. The number of bits of the product D_r is the same as that of the operands A and B. The rounding circuit 112 performs rounding according to a preset rounding mode, such as round-to-nearest, round-toward-positive, round-toward-negative or round-toward-zero. The rounding circuit 112 may be incorporated in multiplication circuit 110, or the multiplication circuit 110 and the rounding circuit 112 may be separate circuits.

The operation result R_no1=D_r of the multiplication operation of the computing architecture 100 is outputted in stage 1 (step S230). The product D and the product D_r are inputted to the selection circuit 120 in stage 2 (step S235). Next, the control circuit 140 determines whether the mac operation or the fused mac operation is performed on the operands A, B, and C by the computing architecture 100 of the floating-point number operation circuit (step S240) and correspondingly controls the selection circuit 120 to output the product D or the product D_r. When the mac operation is performed, the control circuit 140 controls the selection circuit 120 to output the product D_r, and the addition circuit 130 accordingly adds the operand C and the product D_r in stage 2 (step S250). When the fused mac operation is performed, the control circuit 140 controls the selection circuit 120 to output the product D, and the addition circuit 130 accordingly adds the operand C and the product D in stage 2 (step S260). Note that the addition circuit 130 may receive the operand C in stage 1 or stage 2. Finally, the rounding circuit 132 rounds the sum outputted by the addition circuit 130 (step S270) to thereby generate an operation result R_no2. More specifically, according to the selection of the selection circuit 120, the rounding circuit 132 rounds the result of C+D or the result of C+D_r. The number of bits of the operation result R_no2 is the same as that of the operands A, B, and C. The computing architecture 100 of the floating-point number operation circuit outputs the operation result R_no2 as the outcome of the mac operation or the fused mac operation (step S280). The rounding circuit 132 may be incorporated in the addition circuit 130, or the addition circuit 130 and the rounding circuit 132 may be separate circuits. Stage 2 follows stage 1.

The computing architecture 100 of the floating-point number operation circuit operates according to a working clock. More specifically, the multiplication circuit 110, the rounding circuit 112, the selection circuit 120, the addition circuit 130, the rounding circuit 132, and the control circuit 140 operate according to the working clock. The multiplication circuit 110 is a pipelined circuit and takes at least one cycle of the working clock; that is, from the reception of the operands A, B to the generation of the operation result R_no1, the multiplication circuit 110 needs at least one cycle of the working clock. Similarly, the addition circuit 130 is a pipelined circuit and takes at least one cycle of the working clock; that is, from the reception of the operand C and the product (D or D_r) to the generation of the operation result R_no2, the addition circuit 130 needs at least one cycle of the working clock.

As shown in FIG. 1, the multiplication circuit 110 is responsible for not only the multiplication operation (A*B) but also the multiplication part of the mac operation (A*B+C) and the fused mac operation (A*B+C). Furthermore, since the addition circuit 130 is responsible for the addition part of the mac operation and the fused mac operation, the addition circuit 130 assigns a general number of bits (depending on the designed precision of the computing architecture 100 of the floating-point number operation circuit) to one of the operands (operand C) and assigns the unrounded number of bits to the other operand (D or D_r). Taking double precision as an example, the total number of input bits of the addition circuit 130 is 64 bits+119 bits, in which 1, 12 and 106 bit(s) of the 119 bits represent(s) the sign, the biased exponent, and the trailing significand, respectively. As a comparison, the total number of input bits of an addition circuit applied exclusively to a mac operation (i.e., the addition circuit is not shared by a fused mac operation) is 64 bits+64 bits.

Figure 3:
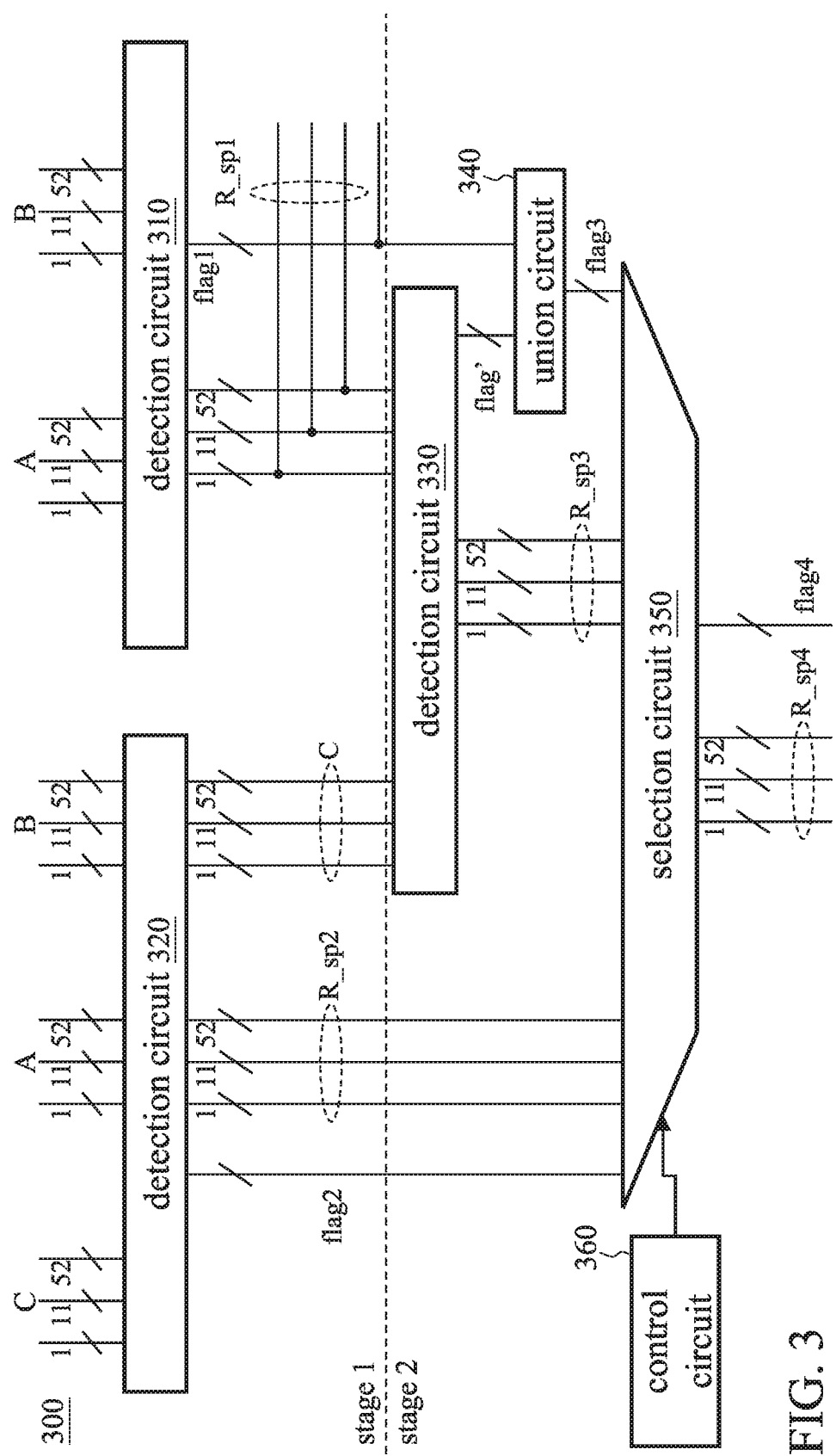
FIG. 3 illustrates a circuit diagram of a detection section of a floating-point number operation circuit according to an embodiment of the present invention.

FIG. 3 is a circuit diagram of a detection section of a floating-point number operation circuit according to an embodiment of the present invention. The detection architecture 300 of the floating-point number operation circuit is configured to detect special values in a floating-point number operation and includes the detection circuit 310, the detection circuit 320, the detection circuit 330, the union circuit 340, the selection circuit 350, and the control circuit 360. The control circuit 360 may share circuits with the control circuit 140 of FIG. 1, or the control circuit 360 and the control circuit 140 may be implemented with separate circuits. The detection architecture 300 of the floating-point number operation circuit is configured to detect whether the operands A, B, and C are special values. When part or all of the operands A, B, and C are special values, the operation results of the multiplication operation, the mac operation, and the fused mac operation may be generated by the detection architecture 300 of the floating-point number operation circuit, and these operations do not require the computing architecture 100 of the floating-point number operation circuit to operate or compute. Special values include ±0, ±∞, not a number (NaN), subnormal, and so on. For example, the results of the following operations can be determined by the detection architecture 300 of the floating-point number operation circuit and do not require the computing architecture 100 of the floating-point number operation circuit to operate or compute:

$$\pm\infty * 0 = NaN \quad (1)$$

$$\pm\infty * F1 = \pm\infty \quad (2)$$

$$\pm 0 * F1 = \pm 0 \quad (3)$$

$$\pm 0 + F1 = F1 \quad (4)$$

$$F1 * F2 + NaN = NaN \quad (5)$$

Where F1 and F2 are normal floating-point numbers (i.e., F1 and F2 are not special values) or are subnormal. Examples (1) to (5) are for the purpose of explanation, not for limiting the scope of the present invention.

The detection circuit 310 corresponds to the multiplication operation, the detection circuit 320 corresponds to the fused mac operation, and the detection circuit 330 corresponds to the addition operation. The detection circuit 310, the detection circuit 320, and the detection circuit 330 further correspondingly output the status flag of their respective operations. According to the definition of IEEE 754-2008, the status flags include (1) invalid operation, (2) divided by zero, (3) overflow, (4) underflow, and (5) inexact. In addition to these five types, the status flags may also include user-defined flags.

Figure 4:
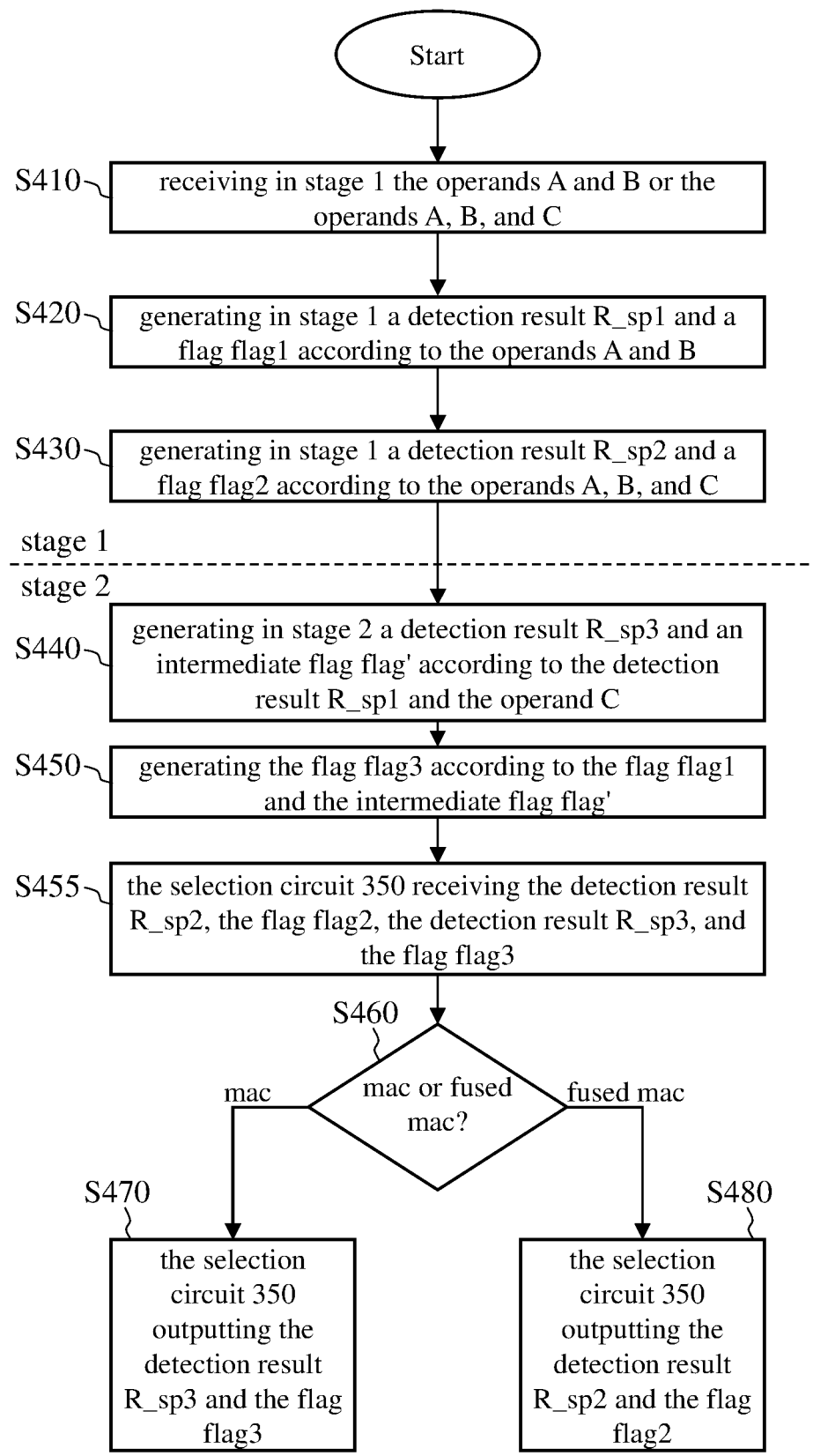
FIG. 4 illustrates a flowchart of a detection section of a floating-point number operation method according to an embodiment of the present invention.

FIG. 4 is a flowchart of a detection section of a floating-point number operation method according to an embodiment of the present invention. This flowchart corresponds to the circuit diagram of FIG. 3. The detection architecture 300 of the floating-point number operation circuit receives in stage 1 the operands A and B (received by the detection circuit 310) or the operands A, B, and C (received by the detection circuit 320) (step S410). The detection circuit 310 generates in stage 1 a detection result R_sp1 and a flag flag1 according to the operands A and B (step S420). The detection result R_sp1 and the flag flag1 correspond to the multiplication operation. The detection result R_sp1 is, for example, one of the special values mentioned above. More specifically, if at least one of the operands A and B is a special value, the multiplication operation becomes an invalid operation or does not require any operation or computation. In this case, the multiplication operation does not require the multiplication circuit 110 to operate or compute; instead, the operation result of the multiplication operation is generated by the detection circuit 310 in stage 1.

The detection circuit 320 generates in stage 1 a detection result R_sp2 and a flag flag2 according to the operands A, B, and C (step S430). The detection result R_sp2 and the flag flag2 correspond to the fused mac operation. The detection result R_sp2 is, for example, one of the special values mentioned above. More specifically if at least one of the operands A, B, and C is a special value, the fused mac operation may become an invalid operation or does not require any operation. In this case, the fused mac operation does not require the multiplication circuit 110 and the addition circuit 130 to operate or compute; instead, the operation result of the fused mac operation is generated by the detection circuit 320 in stage 1.

The detection circuit 330 generates in stage 2 a detection result R_sp3 and an intermediate flag flag' according to the detection result R_sp1 and the operand C (step S440). The union circuit 340 generates the flag flag3 according to the flag flag1 and the intermediate flag flag (step S450). More specifically, the union circuit 340 performs bitwise OR operation on the flag flag1 and the intermediate flag flag to generate the flag flag3. The detection result R_sp3 and the flag flag3 correspond to the mac operation.

In stage 2, the selection circuit 350 receives the detection result R_sp2 and the flag flag2 from the detection circuit 320, receives the detection result R_sp3 from the detection circuit 330, and receives the flag flag3 from the union circuit 340 (step S455). Next, the control circuit 360 determines whether the mac operation or the fused mac operation is performed on the operands A, B, and C by the detection architecture 300 of the floating-point number operation circuit (step S460), and controls the selection circuit 350 to output (R_sp2, flag2) or (R_sp3, flag3) as the final detection result R_sp4 and the final flag flag4. When the mac operation is performed, the control circuit 360 controls the selection circuit 350 to output the detection result R_sp3 and the flag flag3 in stage 2 (step S470). When the fused mac operation is performed, the control circuit 360 controls the selection circuit 350 to output the detection result R_sp2 and the flag flag2 in stage 2 (step S480).

Figure 5:
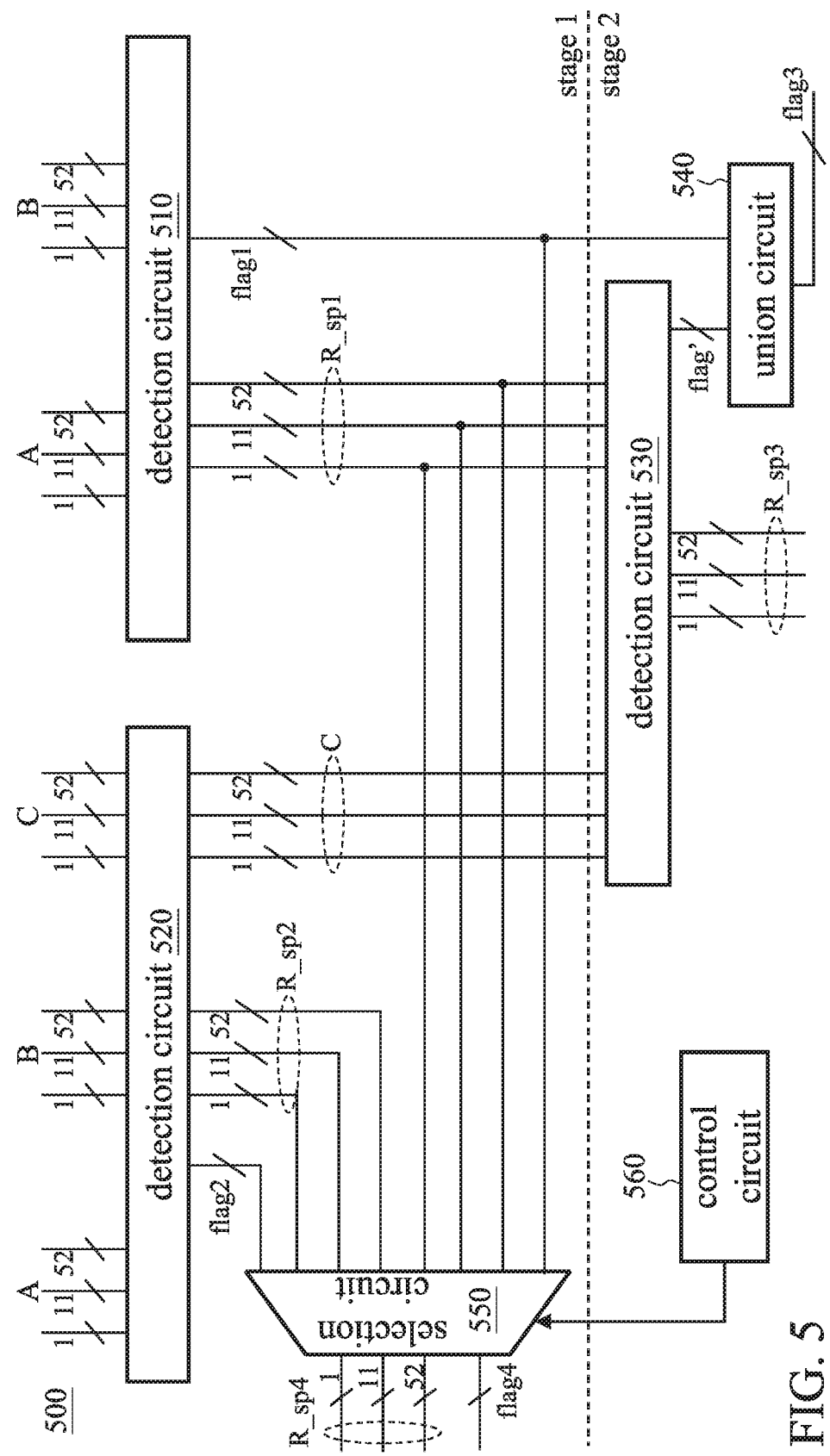
FIG. 5 illustrates a circuit diagram of a detection section of a floating-point number operation circuit according to another embodiment of the present invention.

FIG. 5 is a circuit diagram of a detection section of a floating-point number operation circuit according to another embodiment of the present invention. The detection architecture 500 of the floating-point number operation circuit is configured to detect special values in a floating-point number operation and includes the detection circuit 510, the detection circuit 520, the detection circuit 530, the union circuit 540, the selection circuit 550, and the control circuit 560. The control circuit 560 may share circuits with the control circuit 140 of FIG. 1, or the control circuit 560 and the control circuit 140 may be implemented with separate circuits. The detection architecture 500 of the floating-point number operation circuit is configured to detect whether the operands A, B, and C are special values. When part or all of the operands A, B, and C are special values, the operation results of the multiplication operation, the mac operation, and the fused mac operation may be generated by the detection architecture 500 of the floating-point number operation circuit, and these operations do not require the computing architecture 100 of the floating-point number operation circuit to operate or compute. The detection circuit 510 corresponds to the multiplication operation, the detection circuit 520 corresponds to the fused mac operation, and the detection circuit 530 corresponds to the addition operation. The detection circuit 510, the detection circuit 520, and the detection circuit 530 further correspondingly output the status flag of their respective operations.

Figure 6:
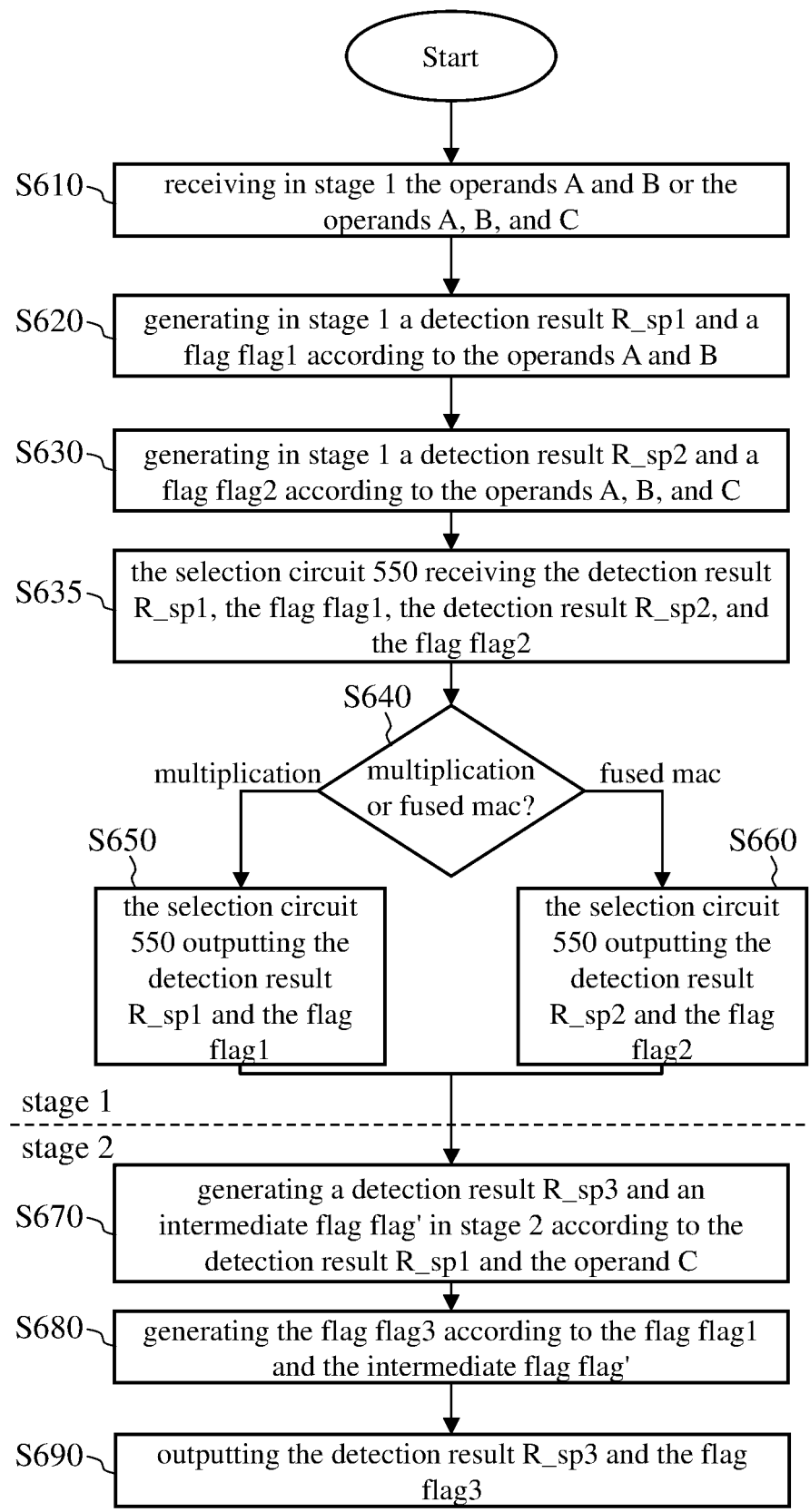
FIG. 6 illustrates a flowchart of a detection section of a floating-point number operation method according to another embodiment of the present invention.

FIG. 6 is a flowchart of a detection section of a floating-point number operation method according to another embodiment of the present invention. This flowchart corresponds to the circuit diagram of FIG. 5. The detection architecture 500 of the floating-point number operation circuit receives in stage 1 the operands A and B (received by the detection circuit 510) or the operands A, B, and C (received by the detection circuit 520) (step S610). The detection circuit 510 generates in stage 1 a detection result R_sp1 and a flag flag1 according to the operands A and B (step S620). The detection result R_sp1 and the flag flag1 correspond to the multiplication operation. The detection result R_sp1 is, for example, one of the special values mentioned above. More specifically, if at least one of the operands A and B is a special value, the multiplication operation becomes an invalid operation or does not require any operation. In this case, the multiplication operation does not require the multiplication circuit 110 to operate or compute; instead, the operation result of the multiplication operation is generated by the detection circuit 510 in stage 1.

The detection circuit 520 generates in stage 1 a detection result R_sp2 and a flag flag2 according to the operands A, B, and C (step S630). The detection result R_sp2 and the flag flag2 correspond to the fused mac operation. The detection result R_sp2 is, for example, one of the special values mentioned above. More specifically, if at least one of the operands A, B, and C is a special value, the fused mac operation may become an invalid operation or does not require any operation. In this case, the fused mac operation does not require the multiplication circuit 110 and the addition circuit 130 to operate or compute; instead, the operation result of the fused mac operation is generated in stage 1 by the detection circuit 520.

In stage 1, the selection circuit 550 receives the detection result R_sp1 and the flag flag1 from the detection circuit 510 and receives the detection result R_sp2 and the flag flag2 from the detection circuit 520 (step S635). Next, the control circuit 560 determines whether the multiplication operation or the fused mac operation is performed on the operands A, B, and C by the detection architecture 500 of the floating-point number operation circuit (step S640), and controls the selection circuit 550 to output (R_sp1, flag1) or (R_sp2, flag2) as the detection result R_sp4 of stage 1 and the flag flag4 of stage 1. When the multiplication operation is performed, the control circuit 560 controls the selection circuit 550 to output the detection result R_sp1 and the flag flag1 in stage 1 (step S650). When the fused mac operation is performed, the control circuit 560 controls the selection circuit 550 to output the detection result R_sp2 and the flag flag2 in stage 1 (step S660).

The detection circuit 530 generates a detection result R_sp3 and an intermediate flag flag' in stage 2 according to the detection result R_sp1 and the operand C (step S670). The union circuit 540 generates the flag flag3 according to the flag flag1 and the intermediate flag flag' (step S680). More specifically, the union circuit 540 performs bitwise OR operation on the flag flag1 and the intermediate flag flag' to generate the flag flag3. The detection result R_sp3 and the flag flag3 correspond to the mac operation and are outputted in stage 2 (step S690).

The detection circuits 310-330 and the detection circuits 510-530 can be implemented with logic circuits. Details as to how these detection circuits generate the detection results and flags according to the input values are well-known to those skilled in the art and are thus omitted for brevity.

The computing architecture 100 of the floating-point number operation circuit of FIG. 1 may be combined with the detection architecture 300 of FIG. 3 or the detection architecture 500 of FIG. 5 to form the floating-point number operation circuit of the present invention. In the embodiment in which FIG. 1 and FIG. 3 are combined, the result of the multiplication operation (the result R_no1 for general calculations or the detection result R_sp1 for special values) is outputted in stage 1, and the result of the mac operation or the fused mac operation (the result R_no2 for general calculations or the detection result R_sp4 for special values) is outputted in stage 2. In the embodiment in which FIG. 1 and FIG. 5 are combined, the result of the multiplication operation (the result R_no1 for general calculations or the detection result R_sp1 for special values) and the detection result R_sp2 of the fused mac operation for special values are outputted in stage 1, and the result R_no2 of the fused mac operation or the mac operation for general calculations and the detection result R_sp3 of the mac operation for special values are outputted in stage 2. Therefore, compared with the embodiment of the combination of FIG. 1 and FIG. 3, in the embodiment of the combination of FIG. 1 and FIG. 5, there is a chance to obtain the outcome of the fused mac operation earlier (in stage 1 instead of stage 2).

The foregoing control circuits 140, 360, and 560 are respectively in electrical connection with other circuits in FIGS. 1, 3, and 5 (for brevity, these connections are not shown) to control the scheduling of various operations and the use of resources on each calculation path. The control circuits 140, 360, and 560 can be implemented, for example but not limited thereto, with finite-state machines (FSM).

In the computing architecture 100 of the floating-point number operation circuit, the control circuit 140 may (1) respond to multiplication instructions to control the multiplication circuit 110 to perform operations (corresponding steps S210 to S230); (2) respond to the mac operation instructions to control the multiplication circuit 110 and the addition circuit 130 to perform operations and control the selection circuit 120 to select the product D_r rather than the product D (corresponding to steps S210-S250, S270-S280); and (3) respond to the fused mac operation instructions to control the multiplication circuit 110 and the addition circuit 130 to perform operations and control the selection circuit 120 to select the product D rather than the product D_r (corresponding to steps S210-S240, S260-S280).

In the detection architecture 300 of the floating-point number operation circuit, the control circuit 360 may (1) respond to the multiplication instructions to control the detection circuit 310 to perform detection (corresponding to steps S410 to S420); (2) respond to the fused mac operation instructions to control the detection circuit 320 to perform detection (corresponding to steps S410, S430) and to control the selection circuit 350 to select (R_sp2, flag2) (corresponding to steps S460, S480); and (3) respond to the mac operation instructions to control the detection circuit 310 and the detection circuit 330 to perform detection (corresponding to steps S410 to S420, S440 to S450) and to control the selection circuit 350 to select (R_sp3, flag3) (corresponding to steps S460 to S470).

In the detection architecture 500 of the floating-point number operation circuit, the control circuit 560 may (1) respond to the multiplication instructions to control the detection circuit 510 to perform detection (corresponding to steps S610 to S620) and to control the selection circuit 550 to select (R_sp1, flag1) (corresponding to steps S640 to S650); (2) respond to the fused mac operation instructions to control the detection circuit 520 to perform detection (corresponding to steps S610, S630) and to control the selection circuit 550 to select (R_sp2, flag2) (corresponding to steps S640, S660); and (3) respond to the mac operation instructions to control the detection circuit 510 and the detection circuit 530 to perform detection (corresponding to steps S610 to S620, S670 to S690).

The present invention provides two embodiments of a floating-point number operation circuit: (1) the combination of FIG. 1 and FIG. 3 (corresponding to the flows of FIG. 2 and FIG. 4); and (2) the combination of FIG. 1 and FIG. 5 (corresponding to the flows of FIG. 2 and FIG. 6). Both embodiments integrate the multiplication operation, the mac operation, and the fused mac operation and optimize the three operations at the same time. Therefore, the floating-point number operation circuit of the present invention can improve the processor performance in terms of the processing of these three operations and simplify the circuit. It should be noted that the computing architecture 100 of the floating-point number operation circuit of the present invention can operate independently to complete the general calculations of the floating-point numbers, or work with other detection architectures to complete both the general calculations of the floating-point numbers and the detections of special values in the operations of floating-point numbers. Similarly, the detection architectures 300 and 500 of the floating-point number operation circuit can also operate independently or work with other computing architectures.

Since a person having ordinary skill in the art can appreciate the implementation detail and the modification thereto of the present method invention through the disclosure of the device invention, repeated and redundant description is thus omitted. Please note that there is no step sequence limitation for the method inventions as long as the execution of each step is applicable. Furthermore, the shape, size, and ratio of any element and the step sequence of any flowchart in the disclosed figures are exemplary for understanding, not for limiting the scope of this invention. Moreover, in the foregoing embodiments, double precision is used for the purpose of explanation, not for limiting the scope of this invention, and a person having ordinary skill in the art can apply this invention to other precisions based on the disclosure of this invention.

The aforementioned descriptions represent merely the preferred embodiments of the present invention, without any intention to limit the scope of the present invention thereto. Various equivalent changes, alterations, or modifications based on the claims of the present invention are all consequently viewed as being embraced by the scope of the present invention.

What is claimed is:

1. A floating-point number operation circuit configured to perform a fused multiplication and accumulation (fused mac) operation or a multiplication and accumulation (mac) operation on a first operand, a second operand, and a third operand, or perform a multiplication operation on the first operand and the second operand, the floating-point number operation circuit comprising:
a multiplication circuit configured to receive the first operand and the second operand and perform the multiplication operation on the first operand and the second operand to generate an unrounded product and a rounded product;
a selection circuit coupled to the multiplication circuit and configured to receive the unrounded product and the rounded product and output either the unrounded product or the rounded product;
a control circuit coupled to the selection circuit and configured to control the selection circuit to output the rounded product when the floating-point number operation circuit performs the mac operation, and control the selection circuit to output the unrounded product when the floating-point number operation circuit performs the fused mac operation; and
an addition circuit coupled to the selection circuit and configured to receive the third operand and either the unrounded product or the rounded product, and add the third operand and either the unrounded product or the rounded product to obtain an operation result, wherein the operation result is a result of the fused mac operation or the mac operation;
wherein a total number of input bits of the addition circuit is greater than twice the number of bits of the first, second or third operand;
wherein the floating-point number operation circuit operates according to a clock, the multiplication circuit operates in a first stage and takes at least one cycle of the clock, the addition circuit operates in a second stage and takes at least one cycle of the clock, the second stage follows the first stage, and the addition circuit receives the third operand in the first stage.

2. The floating-point number operation circuit of claim 1, wherein the multiplication circuit generates the rounded product in the first stage.

3. The floating-point number operation circuit of claim 1, wherein the selection circuit is a first selection circuit, the floating-point number operation circuit further comprising:
a first detection circuit configured to receive the first operand and the second operand in the first stage and generate in the first stage a first detection result and a first flag according to the first operand and the second operand, wherein the first detection result and the first flag correspond to the multiplication operation;
a second detection circuit configured to receive the first operand, the second operand, and the third operand in the first stage and generate in the first stage a second detection result and a second flag according to the first operand, the second operand, and the third operand, wherein the second detection result and the second flag correspond to the fused mac operation;
a third detection circuit coupled to the first detection circuit and the second detection circuit and configured to receive in the second stage the first detection result and the third operand and generate in the second stage a third detection result and an intermediate flag according to the first detection result and the third operand;
a union circuit coupled to the first detection circuit and the third detection circuit and configured to generate a third flag according to the first flag and the intermediate flag, wherein the third flag is a union of the first flag and the intermediate flag, and the third detection result and the third flag correspond to the mac operation; and
a second selection circuit coupled to the second detection circuit, the third detection circuit, and the union circuit and configured to receive the second detection result, the second flag, the third detection result, and the third flag;
wherein the control circuit is further coupled to the second selection circuit;

wherein when the floating-point number operation circuit performs the fused mac operation, the control circuit controls the second selection circuit to output the second detection result and the second flag, and when the floating-point number operation circuit performs the mac operation, the control circuit controls the second selection circuit to output the third detection result and the third flag.

4. The floating-point number operation circuit of claim 3, wherein the control circuit controls the second selection circuit to output the second detection result and the second flag in the second stage or output the third detection result and the third flag in the second stage.

5. The floating-point number operation circuit of claim 1, wherein the selection circuit is a first selection circuit, the floating-point number operation circuit further comprising:
 a first detection circuit configured to receive the first operand and the second operand in the first stage and generate in the first stage a first detection result and a first flag according to the first operand and the second operand, wherein the first detection result and the first flag correspond to the multiplication operation;
 a second detection circuit configured to receive the first operand, the second operand, and the third operand in the first stage and generate in the first stage a second detection result and a second flag according to the first operand, the second operand, and the third operand, wherein the second detection result and the second flag correspond to the fused mac operation;
 a second selection circuit coupled to the first detection circuit and the second detection circuit and configured to receive the first detection result, the first flag, the second detection result, and the second flag;
 a third detection circuit coupled to the first detection circuit and the second detection circuit and configured to receive in the second stage the first detection result and the third operand and generate in the second stage a third detection result and an intermediate flag according to the first detection result and the third operand; and
 a union circuit coupled to the first detection circuit and the third detection circuit and configured to generate a third flag according to the first flag and the intermediate flag, wherein the third flag is a union of the first flag and the intermediate flag, and the third detection result and the third flag correspond to the mac operation;
 wherein the control circuit is further coupled to the second selection circuit;
 wherein when the floating-point number operation circuit performs the multiplication operation, the control circuit controls the second selection circuit to output the first detection result and the first flag, and when the floating-point number operation circuit performs the fused mac operation, the control circuit controls the second selection circuit to output the second detection result and the second flag.

6. The floating-point number operation circuit of claim 5, wherein the control circuit controls the second selection circuit to output the first detection result and the first flag in the first stage or output the second detection result and the second flag in the first stage.

7. A floating-point number operation circuit configured to perform a fused multiplication and accumulation (fused mac) operation or a multiplication and accumulation (mac) operation on a first operand, a second operand, and a third operand, or perform a multiplication operation on the first operand and the second operand, the floating-point number operation circuit comprising:
 a multiplication circuit configured to receive the first operand and the second operand and perform the multiplication operation on the first operand and the second operand to generate an unrounded product and a rounded product;
 a first selection circuit coupled to the multiplication circuit and configured to receive the unrounded product and the rounded product and output either the unrounded product or the rounded product;
 a control circuit coupled to the first selection circuit and configured to control the first selection circuit to output the rounded product when the floating-point number operation circuit performs the mac operation, and control the first selection circuit to output the unrounded product when the floating-point number operation circuit performs the fused mac operation;
 an addition circuit coupled to the first selection circuit and configured to receive the third operand and either the unrounded product or the rounded product, and add the third operand and either the unrounded product or the rounded product to obtain an operation result, wherein the operation result is a result of the fused mac operation or the mac operation;
 a first detection circuit configured to receive the first operand and the second operand in a first stage and generate in the first stage a first detection result and a first flag according to the first operand and the second operand, wherein the first detection result and the first flag correspond to the multiplication operation;
 a second detection circuit configured to receive the first operand, the second operand, and the third operand in the first stage and generate in the first stage a second detection result and a second flag according to the first operand, the second operand, and the third operand, wherein the second detection result and the second flag correspond to the fused mac operation;
 a third detection circuit coupled to the first detection circuit and the second detection circuit and configured to receive in a second stage the first detection result and the third operand and generate in the second stage a third detection result and an intermediate flag according to the first detection result and the third operand;
 a union circuit coupled to the first detection circuit and the third detection circuit and configured to generate a third flag according to the first flag and the intermediate flag, wherein the third flag is a union of the first flag and the intermediate flag, and the third detection result and the third flag correspond to the mac operation; and
 a second selection circuit coupled to the control circuit, the second detection circuit, the third detection circuit, and the union circuit and configured to receive the second detection result, the second flag, the third detection result, and the third flag;
 wherein a total number of input bits of the addition circuit is greater than twice the number of bits of the first, second or third operand;
 wherein the floating-point number operation circuit operates according to a clock, the multiplication circuit operates in the first stage and takes at least one cycle of the clock, the addition circuit operates in the second stage and takes at least one cycle of the clock, and the second stage follows the first stage;
 wherein when the floating-point number operation circuit performs the fused mac operation, the control circuit controls the second selection circuit to output the second detection result and the second flag, and when the floating-point number operation circuit performs the mac operation, the control circuit controls the second selection circuit to output the third detection result and the third flag.

8. The floating-point number operation circuit of claim 7, wherein the control circuit controls the second selection circuit to output the second detection result and the second flag in the second stage or output the third detection result and the third flag in the second stage.

9. The floating-point number operation circuit of claim 7, wherein the multiplication circuit generates the rounded product in the first stage.

10. A floating-point number operation circuit configured to perform a fused multiplication and accumulation (fused mac) operation or a multiplication and accumulation (mac) operation on a first operand, a second operand, and a third operand, or perform a multiplication operation on the first operand and the second operand, the floating-point number operation circuit comprising:
  a multiplication circuit configured to receive the first operand and the second operand and perform the multiplication operation on the first operand and the second operand to generate an unrounded product and a rounded product;
  a first selection circuit coupled to the multiplication circuit and configured to receive the unrounded product and the rounded product and output either the unrounded product or the rounded product;
  a control circuit coupled to the first selection circuit and configured to control the first selection circuit to output the rounded product when the floating-point number operation circuit performs the mac operation, and control the first selection circuit to output the unrounded product when the floating-point number operation circuit performs the fused mac operation; and
  an addition circuit coupled to the first selection circuit and configured to receive the third operand and either the unrounded product or the rounded product, and add the third operand and either the unrounded product or the rounded product to obtain an operation result, wherein the operation result is a result of the fused mac operation or the mac operation;
  a first detection circuit configured to receive the first operand and the second operand in a first stage and generate in the first stage a first detection result and a first flag according to the first operand and the second operand, wherein the first detection result and the first flag correspond to the multiplication operation;
  a second detection circuit configured to receive the first operand, the second operand, and the third operand in the first stage and generate in the first stage a second detection result and a second flag according to the first operand, the second operand, and the third operand, wherein the second detection result and the second flag correspond to the fused mac operation;
  a second selection circuit coupled to the control circuit, the first detection circuit and the second detection circuit and configured to receive the first detection result, the first flag, the second detection result, and the second flag;
  a third detection circuit coupled to the first detection circuit and the second detection circuit and configured to receive in a second stage the first detection result and the third operand and generate in the second stage a third detection result and an intermediate flag according to the first detection result and the third operand; and
  a union circuit coupled to the first detection circuit and the third detection circuit and configured to generate a third flag according to the first flag and the intermediate flag, wherein the third flag is a union of the first flag and the intermediate flag, and the third detection result and the third flag correspond to the mac operation;
  wherein a total number of input bits of the addition circuit is greater than twice the number of bits of the first, second or third operand;
  wherein the floating-point number operation circuit operates according to a clock, the multiplication circuit operates in the first stage and takes at least one cycle of the clock, the addition circuit operates in the second stage and takes at least one cycle of the clock, and the second stage follows the first stage;
  wherein when the floating-point number operation circuit performs the multiplication operation, the control circuit controls the second selection circuit to output the first detection result and the first flag, and when the floating-point number operation circuit performs the fused mac operation, the control circuit controls the second selection circuit to output the second detection result and the second flag.

11. The floating-point number operation circuit of claim 10, wherein the control circuit controls the second selection circuit to output the first detection result and the first flag in the first stage or output the second detection result and the second flag in the first stage.

12. The floating-point number operation circuit of claim 10, wherein the multiplication circuit generates the rounded product in the first stage.

* * * * *